United States Patent [19]
Steel et al.

[11] Patent Number: 6,013,226
[45] Date of Patent: Jan. 11, 2000

[54] METAL CARBIDE-CONTAINING REFRACTORY MATERIALS

[75] Inventors: Margaret Steel; Philip Norton-Berry, both of Frodsham, United Kingdom

[73] Assignee: Surface Transforms Ltd., Frodsham, United Kingdom

[21] Appl. No.: 09/091,413

[22] PCT Filed: Dec. 23, 1996

[86] PCT No.: PCT/GB96/03217

§ 371 Date: Oct. 21, 1998

§ 102(e) Date: Oct. 21, 1998

[87] PCT Pub. No.: WO97/23431

PCT Pub. Date: Jul. 3, 1997

[30] Foreign Application Priority Data

Dec. 23, 1995 [GB] United Kingdom ................... 9526516

[51] Int. Cl.[7] ...................................... B22F 3/15
[52] U.S. Cl. ............................ 419/49; 423/439; 423/440; 501/87; 501/88; 264/500; 264/29.1
[58] Field of Search ............................... 419/49; 423/439, 423/440; 501/87, 88; 264/500, 29.1

[56] References Cited

U.S. PATENT DOCUMENTS

| | | | |
|---|---|---|---|
| 3,914,371 | 10/1975 | Benton et al. | 264/322 |
| 4,126,652 | 11/1978 | Oohara et al. | 264/29.6 |
| 4,702,900 | 10/1987 | Kurachi et al. | 423/345 |
| 4,948,573 | 8/1990 | Nadkarni et al. | 423/291 |
| 5,258,337 | 11/1993 | Cameron et al. | 501/87 |
| 5,294,460 | 3/1994 | Tani et al. | 427/228 |

FOREIGN PATENT DOCUMENTS

| | | |
|---|---|---|
| 0 412 428 | 2/1991 | European Pat. Off. . |
| 40 15 358 | 11/1990 | Germany . |

*Primary Examiner*—Ngoclan Mai
*Attorney, Agent, or Firm*—Bacon & Thomas

[57] ABSTRACT

Metal carbide-containing refractory materials are prepared by pyrolysing blanks comprising reactive metal sources and carbon-containing precursors under fluid pressure, e.g., using hot isostatic pressing techniques. Refractory composites containing ceramic fillers, reinforcing materials such as carbon fillers, excess carbon or excess metal are readily prepared thereby.

11 Claims, No Drawings

METAL CARBIDE-CONTAINING REFRACTORY MATERIALS

The present invention relates to a process for the production of metal-containing refractory materials, to refractory materials obtainable thereby and to compositions (hereinafter "blanks") for use in said process.

Refractory materials are useful in products which require resistance to extreme conditions, especially heat. Examples of such products include vehicle components such as aircraft brakes, space vehicle heat shields, etc.

EP-A-0373761 discloses a process in which a thermoformable carbon-containing precursor composition having defined viscosity characteristics is formed into a blank to which isostatic pressure is applied using an appropriate gaseous medium. The blank, which may if desired additionally contain refractory filler or reinforcement material, e.g. in particulate or fibrous form, is then heated so as to permit flow but not pyrolysis of the precursor composition, whereby the blank becomes sealed so that the isostatic pressure is electively transferred to the whole blank. The blank is thereafter heated further under an isostatic pressure of at least 500 bar to pyrolyse the precursor composition. This hot isostatic pressing (HIP) process obviates the previously felt need hermetically to seal the blank in an impervious envelope (e.g. comprising mild steel or molten glass) capable of withstanding the processing temperature (e.g. up to 2000° C. or more), while yielding pyrolysed products which surprisingly retain their original shapes, remaining substantially undistorted and non-blistered during the HIP process.

The present invention is based on the finding that metal carbide-containing refractory materials may be formed in a particularly efficient and economical manner by pyrolysis under appropriate fluid pressure of a carbon-containing precursor together with a reactive metal source. This process permits the production of a wide range of metal carbide monoliths and composites with appropriate refractory properties.

Thus according to one aspect of the present invention there is provided a process for producing a metal carbide-containing refractory material wherein a blank comprising a reactive metal source and a carbon-containing precursor is pyrolysed under fluid pressure.

A particular advantage of the process of the invention is that in general the blanks do not suffer undue change of shape during processing, any change in dimensions normally being isotropic. The blanks thus retain "near-net shape".

The fluid pressure used in the process is conveniently that of an inert gas applied directly to the surface of the blank, although the blank may if desired be encased in a hermetically sealed envelope throughout the process. Thus, the process can comprise hot isostatic pressing, and the following description particularly relates to such use of HIP. The term "inert ga" as used herein refers to a substance which is in gaseous form under the conditions of the process and which does not have a deleterious effect on the process or product. Thus, if the process is a carbothermic reduction process, the inert gas can be a gas which will facilitate that process.

It will be appreciated that metals useful in the reactive metal source are those which are able to form one or more carbides. Such metals include those which are themselves refractory, for example, metals whose melting point is 1300° C. or higher. The metal may be, for example, a member of Group II (e.g. IIa), III (e.g. IIIb), IV, V (e.g. Va) or VI (e.g. VIb) of the Mendeléef Periodic Table of Elements (CAS version). Table 1 presents, by way of example, metals which are known to form carbides.

TABLE 1

| Metal | Symbol | Melting Point (° C.) | Group of the Mendeleéf Periodic Table of Elements |
|---|---|---|---|
| Silicon | Si | 1420 | IVb |
| Titanium | Ti | 1850 | IVa |
| Hafnium | Hf | 2500 | VIa |
| Molybdenum | Mo | 2500 | VIa |
| Tantalum | Ta | 2900 | Va |
| Tungsten | W | 2900–3000 | Va |
| Zirconium | Zr | 2130 | IVa |
| Boron | B | 2300 | IIIb |
| Beryllium | Be | 1280 | IIa |

It will be seen that the melting points of the above metals largely fall within the range 1400° C. to 3000° C., most being in the range 1800° C. to 3000° C.

Where the metal does not melt during the process according to the invention, the process may be regarded as one of high pressure sintering.

In the process according to the invention the reactive metal source may, for example, be the metal itself or an oxide or other suitable derivative thereof. The metal source is conveniently in powder or other finely divided form.

If desired, the metal source may comprise two or more components, for example two or more metals or metal derivatives, or one or more metals with one or more metal derivatives. If the metal source includes, for example, boron or a boron carbide in addition to another metal (and/or metal derivative), the process may lead to formation of metal boride-containing as well as metal carbide-containing products.

The carbon-containing precursor used in the process according to the invention should be capable of producing carbon, for example in the form of polycrystalline graphite, on pyrolysis. Representative precursors include thermoformable carbon-containing compositions as described in the aforementioned EP-A-0373761.

Thus the carbon-containing precursor may conveniently be a polycyclic aromatic or other carbocyclic substance, for example a thermoformable hydrocarbon polymer such as a polyphenylene. Such polymers are preferably formed from moieties having high concentrations of aromatic rings. Particularly suitable are high temperature performance thermoplastic polymers such as poly(aryl)ethers, including poly (aryl ketones), poly(aryl ether sulphones), poly(aryl sulphides) and polyphenylenes and suitably modified high temperature pitches. The preparation of such poly(aryl ethers) is described in GB-A-971227, GB-A-1016245, GB-A-1060546, GB-A-1078234, U.S. Pat. No. 3442857 U.S. Pat. No. 3953400 and EP-A-0001879.

Examples of other preferred forms of polymers include:
(a) polyether ketones, including polyetherether ketones (for example polyaryletheretherketones such as polyphenyletherether ketones);
(b) polyetherimides (for example, polyaryletherimides such as polyphenyletherimides);
(c) polyethersulphones, including polyetherethersulphones (for example polyaryletherethersulphones such as polyphenyletherethersulphones); and
(d) pitches based on coal tar and petroleum, suitably modified to be thermoplastic and comprising polycyclic aromatic hydrocarbons.

The carbon-containing precursor may also comprise a curable thermosettable material, for example a thermosetting polymer, a phenolic or furfuryl resin. The formation of blanks using such curable materials is relatively straightforward given their relatively low viscosities in the uncured state. After mixing with the reactive metal source, such materials may conveniently be cured sufficiently to give a form-stable blank which is easy to handle. It is preferable to use resins which give high coke yields on pyrolysis.

Blanks for use in the process according to the invention conveniently comprise carbon-containing precursor in intimate mixture with reactive metal source. For example, in producing a blank for use in the process, a reactive metal source in finely divided form may be mixed with an aromatic polymer or other carbon-containing precursor to provide a metal-filled polymer. The aromatic polymer may, for example, be in the form of a powder or a liquid (either being molten or in other liquid form), which may readily be mixed with the metal source. If desired the polymer may be produced in situ from a monomer or oligomer thereof, for example after being mixed with or otherwise applied to the reactive metal source.

Such blanks, e.g. comprising a reactive metal source in intimate admixture with a pyrolysable carbon-containing precursor, constitute a further feature of the present invention.

For most applications it is desirable for the refractory product of the process to be substantially free from porosity, or at least substantially free from voids, especially voids of irregular size. In such circumstances the blank itself should be substantially free from such voids and, when a substantially wholly non-porous product is required, free from substantially any porosity at the start of the process. In this case, the pressure used in the process should be sufficient to prevent porosity developing in the blank.

Thus in a further aspect, the present invention provides a process for the production of a metallic refractory material, which comprises:

mixing a refractory metal or a derivative thereof with a high carbon content substance;

compacting the resulting mixture into the form of a blank to remove any voids therefrom;

pyrolysing the blank under conditions of pressure, temperature and time such that said substance is converted into carbon, and undergoes reaction with said metal to form said refractory material.

Hot isostatic pressing is a versatile process in which a wide variety of conditions of pressure, temperature and time can be used. This is particularly advantageous in the process according to the invention, given the fact that the reactivity of the reactive metal source depends on the prevailing conditions.

The normal procedure in hot isostatic pressing comprises placing the blank in a pressure vessel adapted to receive a gas at high pressure and also adapted to be heated to a suitable temperature. After the blank has been inserted into the vessel, the vessel is sealed and the gas pressure and temperature increased at pre-determined rates until they reach the operating pressure and the operating temperature which are maintained for a time (hereinafter the operating time) sufficient to provide a satisfactory product.

It will be appreciated that the operating time is only a portion of the total time during which the blank is subjected to super-atmospheric pressure.

Generally, the operating pressure is at least about 500 bar, for example in the range 750 to 2500 bar and advantageously in the range from 1000 to 2000 bar. The operating temperature is typically at least about 300° C. for example in the range from 750° to 2500° C., advantageously in the range 1000° to 2000° C.

Representative examples of conditions of pressure and temperature which may be used in embodiments of the invention include the following:

TABLE 2

| Reactive metal source | Carbon-containing precursor | Pressure (bar) | Temperature ° C. |
|---|---|---|---|
| (a) Silicon Powder | PEEK | 1000–2500 | 1000–2000 |
| (b) Titanium Powder | PEEK | 1000–2500 | 1000–2000 |
| (c) Silicon Powder | PPP | 1000–2500 | 1000–2000 |
| (d) Titanium Powder | PPP | 1000–2500 | 1000–2000 |
| (e) Silicon Powder | Modified pitch | 1000–2500 | 1000–2000 |
| (f) Silicon Powder | Modified pitch/chopped carbon fibre | 1000–2500 | 1000–2000 |
| (g) Silicon Powder | Cured phenolic resin/impregnated carbon fibre woven preform | 1000–2500 | 1000–2000 |

Key
PEEK denotes polyetheretherketone
PPP denotes polyparaphenylene

The ratio in which the reactive metal source and carbon-containing precursor are used is advantageously selected to provide a desired metal:carbon ratio during processing. This ratio may, for example, be a stoichiometric ratio or one within ±10% (for example ±5%) of the stoichiometric ratio. Thus, where a metal oxide or other metal derivative is used as a reactive metal source, it is normally necessary to make allowance for the amount of metal made available during the process, and for the yield of carbon obtained by pyrolysis of the carbon-containing precursor. In the case where the carbon-containing precursor is a polymer which has been formed in situ, it is also necessary to make allowance for the yield of polymer obtained from the monomer (or oligomer) source. It may be necessary to employ simple testing to determine suitable amounts of reactive metal source and carbon-containing precursor to use in order to obtain a particular product. By way of example the following representative ratios are given for particular embodiments of the invention:

TABLE 3

| Reactive metal source | Carbon-containing precursor | Ratio by weight (Reactive metal source: carbon-containing precursor) |
|---|---|---|
| (a) Silicon Powder | PEEK | 50:50 to 70:30 especially 55:45 to 65:35 |
| (b) Titanium Powder | PEEK | 65:35 to 85:15 especially 70:30 to 80:20 |
| (c) Silicon Powder | PPP | 50:50 to 80:20 especially 60:40 to 75:25 |
| (d) Titanium Powder | PPP | 70:30 to 90:10 especially 75:25 to 85:15 |
| (e) Silicon Powder | Modified pitch | 50:50 to 80:20 especially 60:40 to 75:25 |
| (f) Silicon Powder | Modified pitch/chopped carbon fibre 10% to 40% by weight of pitch | 50:50 to 80:20 especially 60:40 to 75:25 on the matrix |

TABLE 3-continued

| Reactive metal source | Carbon-containing precursor | Ratio by weight (Reactive metal source: carbon-containing precursor) |
|---|---|---|
| (g) Silicon Powder | Cured phenolic resin/woven carbon fibre preform 10% to 30% by weight cured phenolic | 45:50 to 75:25 especially 60:40 to 70:30 |

The ratios given in Table 3 against the letters (a), (b), (c), (d), (e), (f) and (g) respectively are particularly suitable where the conditions of pressure and temperature are those indicated, respectively, by those letters in Table 2.

Products obtainable in accordance with the process of the invention may be prepared in the form of homogenous metal carbide (e.g. silicon carbide) articles, known as monoliths, or as heterogeneous articles, hereinafter termed refractory composites. It will be appreciated that, where appropriate, both monolithic and refractory composite structures may additionally incorporate further reaction products such as metal borides.

Additional components which may be present in refractory composites prepared in accordance with the invention include reinforcing components which may, for example, be introduced into the blank either as such or in the form of precursors which are converted to the desired components during processing. Examples of such additional components include ceramic filler powders and carbon fibers, for example in the form of three dimensional structures; such structures may for example be made by weaving continuous carbon fiber, by needle punching non-woven carbon fiber fabric or by tumbling chopped carbon fiber with a dust comprising the reactive metal source and carbon-containing precursor. Heat pressing and subsequent pyrolysis of such blanks, e.g. under HIP conditions, will form a carbon fiber-reinforced metal carbide product. Carbon fibers may for example be used in amounts such that the carbon fiber content of the end product is 5–75% v/v. Ceramic fillers may for example be used in amounts which provide up to 30% V/V of the end product; in principle any non-reactive filler may be used, representative examples including graphite, metal carbides, metal borides, metal nitrides and metal silicides.

The additional component may alternatively or additionally be a non-stoichiometric excess of carbon-containing precursor and/or reactive metal source. Thus, for example, a carbon-containing precursor may be used in excess to fill a dual function, providing carbon for the reaction process and by way of further or residuary portion providing the additional component.

Such metal carbide-carbon composites may for example contain 10–70% v/v of excess carbon and may if desired also contain carbon fibers, for example in an amount of 10–75% v/v.

Excess reactive metal source may similarly be employed to generate metal carbide-metal composites, for example containing 2–15% v/v of excess metal. Such composites may if desired also contain carbon fibers, for example in an amount of 10–75% v/v.

The invention is illustrated by the following non-limitative Examples in which, unless otherwise stated, all temperatures are in degrees Celsius. The times of heating and cooling relate to the size and shape of the sample, larger samples taking longer to heat and cool than smaller samples.

The following abbreviations are used:
PEEK—polyetheretherketone
PEI—polyetherimide
PPP—polyparaphenylene

EXAMPLE 1

This Example describes the production of silicon carbide using PEEK as a carbon precursor.

63.6 g of silicon powder (5 $\mu$m) was mixed with 36.4 g PEEK powder on a vibro-mixer. The resulting mixture was tamped to ensure a uniform layer and cold-pressed into a disc using a die system similar to that for making infrared sample discs. The die comprised a cylindrical aperture of ½ inches (3.8 cm) diameter in a metal block. The powder was held in the die between two close fitting hardened steel plungers to which a pressure of 20 tons/square inch (309 MPa) was applied for one minute to compress the powder.

The resulting precursor disc was then subjected to hot isostatic pressing under conditions of temperature, pressure and time as shown below.

The hot isostatic pressing process took a total of between 31 hours and 51 hours. During that time the temperature/pressure conditions were as follows:

TABLE 3

| Time (hours) | Temperature (° C.) | Pressure (Bar) |
|---|---|---|
| 1 | increased from room temperature to 200 | 0 to 1960 |
| 6–12 | increased from 200 to 1950 | maintained at 1960 |
| 8–14 | maintained at 1950 | maintained at 1960 |
| 8–12 | decreased from 1950 to 1200 | reduced to 1000 |
| 8–12 | decreased from 1200 to room temperature | reduced from 1000 to 0 |

These conditions would be suitable for a number of small samples or one sample 80 mm×15 mm.

EXAMPLE 2

This Example describes the preparation of silicon carbide using PEEK as a carbon precursor.

50 micron PEEK powder, obtained by grinding and sieving a coarser PEEK powder was mixed with a predetermined amount of silicon powder to give the correct stoichiometric ratio (assuming 79% polymer-to-carbon conversion) and the mixture was vibro-mixed. The resulting mixture was then pressed in a die using the procedure described in Example 1. The resulting precursor disc was then subjected to hot isostatic pressing under the conditions of temperature, pressure and time described in Example 1.

EXAMPLES 3 to 10

Example 1 was repeated but using other powdered elements instead of silicon. These other elements and the products obtained are shown below. Polymer conversions ranging from 66% to 71% were achieved.

| Example No. | Element | Product (Mol. wt) |
|---|---|---|
| 3 | Titanium | Titanium carbide (TiC, 59.92) |
| 4 | Hafnium | Hafnium carbide (HfC, 190.5) |
| 5 | Molybdenum | Molybdenum carbide (MoC, 107.96) |
| 6 | Tantalum | Tantalum carbide |

-continued

| Example No. | Element | Product (Mol. wt) |
|---|---|---|
| 7 | Tungsten | Tungsten carbide ($W_2C$, 379.73) |
| 8 | Zirconium | Zirconium carbide (ZrC, 103.23) |
| 9 | Born | Boron carbide ($B_4C$, 55.29) |
| 10 | Mixture of titanium and boron | Titanium carbide + titanium boride (TiC + $TiB_2$) |

EXAMPLES 11 TO 25

These Examples describe the preparation of several refractory carbides from mixtures comprising a refractory metal and PEEK or PPP as the aromatic carbon precursor.

When PEEK was used as carbon precursor the metal and the carbon precursor, both in powder form, were mixed together and compressed in a die into coherent discs using the procedure described in Example 1.

Where PPP was used as carbon precursor, the test samples were made from the refractory metal and the monomer corresponding to PPP monomer as follows. The monomer was dissolved in acetone to give a solution having a viscosity of 5–10 poise. The metal in the form of a 5 micron powder was mixed with the solution using a shear mixer. The resulting mixture was spread out thinly on a polyethene sheet and the acetone allowed to evaporate. The resulting dried film was converted to polymer by heating in an oven. The oven temperature was initially allowed to rise rapidly to 200° C. and then the temperature was raised slowly over 2 to 3 hours to 400° C. The final product was ground to a fine powder comprising PPP coated metal powder.

Silicon pitch samples were prepared in a similar manner to the silicon PEEK samples using ground pitch instead of PEEK.

In the conversion from the monomer to PPP itself, it was found that 33% was converted. In the subsequent reaction of PPP with silicon to form silicon carbide, 95% of the PPP was converted. In the case of silicon to silicon carbide the polymer conversion was 65% to 75%.

In the case of titanium the polymer conversion was 75% to 102%. The latter figure may be explained by the fact that a carbon/graphite furnace and carbon/graphite furnace furniture were used, and the titanium might have "cracked" any CO or $CO_2$ produced from these sources.

The composition of the silicon-PEEK, silicon-PPP and silicon-modified pitch examples (11 to 25) obtained as described above is given in Tables 4a and 5a. These examples were subjected to hot isostatic pressing under conditions indicated in Tables 4b and 5b.

EXAMPLES 26 AND 27

These Examples describe the preparation of silicon carbide/carbon fiber composites from a carbon precursor, silicon metal and carbon fiber.

Sample 26

Sample 26 was prepared by mixing silicon powder, ground pitch and chopped carbon fibres made by tumbling in a rotary mill and then layering the chopped fiber/silicon/pitch into a mould and pressing to form a blank. The composition and treatment of the sample is shown in Tables 5a and 5b.

Sample 27

A phenolic resin precursor/silicon powder mix was impregnated into a 0–90 woven carbon fabric and cured. Based on a 68% carbon yield of the cured phenolic this gave a composite of 38.5% carbon to 61.5% silicon. Carbon fiber weave is 20% of the uncarbonized precursor. This cured phenolic/carbon fiber/silicon precursor was then treated in a similar manner to the other samples. The composition and treatment of the sample is shown in Tables 5a and 5b.

TABLE 4a

| Example No. | Sample Composition | | | |
|---|---|---|---|---|
| | Metal | % | Carbon Precursor | % |
| 11 | Si | 61.15 | PEEK | 38.38* |
| 12 | Si | 63.62 | PEEK | 36.38 |
| 13 | Si | 65.80 | — | 34.20** |
| 14 | Si | 66.62 | PPP | 33.86 |
| 15 | Si | 68.92 | PPP | 31.08 |
| 16 | Si | 70.92 | PPP | 29.08** |
| 17 | Si | 66.40 | Modified pitch | 33.60 |
| 18 | Si | 68.50** | Modified pitch | 31.50 |
| 19 | Si | 64.00* | Modified pitch | 36.00 |

*Stoichiometric ratio minus 10% Si
**Stoichiometric ratio plus 10% Si

TABLE 4b

| Heat Treatment Conditions | | |
|---|---|---|
| Time (hours) | Temperature ° C. | Pressures (bar) |
| 1 | ↑RT to 200 | ↑0 to 1960 |
| 6–12 | ↑200 to 1950 | maintained at 1960 |
| 8–14 | maintained at 1950 | maintained at 1960 |
| 8–12 | ↓1950 to 1200 | ↓1960 to 1000 |
| 8–12 | ↓1200 to RT | ↓1000 to 0 |

All samples were treated under similar conditions. Conditions suitable for a number of small samples or one sample 80 mm × 15 mm.

TABLE 5a

| Example No. | Sample Composition | | | |
|---|---|---|---|---|
| | Metal | % | Carbon Precursor | % |
| 20 | Ti | 79.37 | PPP | 20.93 |
| 21 | Ti | 74.89 | PEEK | 25.11 |
| 22 | Si / Ti | 24.54 / 41.84 | PPP | 33.62 |
| 23 | W | 91.97 | PEEK | 8.03 |
| 24 | $B_4C$ / W | | PEEK | |
| 25 | W(+B) | | PEEK (+PPP) | |
| 26 | Si | 44.90 | Modified pitch carbon fibre 28.9% | 26.20 |
| 27 | Si | 61.50 | Cured phenolic preform | 38.50 |

TABLE 5b

| Heat Treatment Conditions | | |
|---|---|---|
| Time (hours) | Temperature (° C.) | Pressures (bar) |
| 1 | ↑RT to 200 | ↑0 to 1960 |
| 6–12 | ↑200 to 1950 | maintained at 1960 |
| 8–14 | maintained at | maintained at |

TABLE 5b-continued

| | Heat Treatment Conditions | |
|---|---|---|
| Time (hours) | Temperature (° C.) | Pressures (bar) |
| | 1950 | 1960 |
| 8–12 | ↓1950 to 1200 | ↓1960 to 1000 |
| 8–12 | ↓1200 to RT | 1000 to 0 |

We claim:

1. A process for producing a metal carbide-containing refractory material which comprises pyrolising under fluid pressure a blank comprising a reactive metal source and a thermoplastic carbon-containing precursor.

2. A process as claimed in claim 1 wherein said fluid pressure is provided by hot isostatic pressing.

3. A process as claimed in claim 1 wherein said thermoplastic carbon-containing precursor comprises a polycyclic hydrocarbon.

4. A process as claimed in claim 3 wherein said hydrocarbon comprises at least one polyetherketone, polyethersulphone, polyimide, polyetherimide or pitch.

5. A process as claimed in claim 1 wherein said reactive metal source is selected from the group consisting of metals, metal oxides and mixtures thereof.

6. A process as claimed in claim 1 wherein said metal is selected from silicon, titanium, hafnium, molybdenum, tantalum, tungsten, zirconium, boron and beryllium.

7. A process as claimed in claim 6 wherein said metal comprises silicon and/or boron.

8. A process as claimed in claim 1 wherein the blank contains one or more additional components selected from ceramic fillers, carbon fibers and precursors therefor.

9. A process as claimed in claim 1 wherein the blank contains a non-stoichiometric excess of thermoplastic carbon-containing precursor and/or metal source.

10. A process as claimed in claim 1 wherein the blank is substantially free from pores and voids and is pyrolyzed at a pressure sufficient to prevent development of porosity therein during pyrolysis.

11. A process for the production of a metal carbide-containing refractory material which comprises:

mixing a refractory metal or a derivative thereof with a thermoplastic carbon-containing precursor;

compacting the resulting mixture into the form of a blank so as to remove any voids therefrom; and pyrolyzing said blank under conditions of fluid pressure, temperature and time such that said precursor is converted into carbon and undergoes reaction with said metal to form said refractory material.

* * * * *